US008666863B2

(12) United States Patent
Sakata et al.

(10) Patent No.: US 8,666,863 B2
(45) Date of Patent: Mar. 4, 2014

(54) PROCESSING MONITOR SYSTEM AND METHOD

(75) Inventors: Ross Sakata, Foster City, CA (US); Ila Malde, Redwood City, CA (US); Gourab Basu, Half Moon Bay, CA (US); Tim Gallagher, Highlands Ranch, CO (US); Jeffrey Gill, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 12 days.

(21) Appl. No.: 13/539,135

(22) Filed: Jun. 29, 2012

(65) Prior Publication Data

US 2013/0198075 A1 Aug. 1, 2013

Related U.S. Application Data

(60) Provisional application No. 61/502,784, filed on Jun. 29, 2011.

(51) Int. Cl.
*G06Q 40/00* (2012.01)
(52) U.S. Cl.
USPC .............................................. 705/35; 705/39
(58) Field of Classification Search
USPC ........................................... 705/35, 7, 38, 39
See application file for complete search history.

(56) References Cited

U.S. PATENT DOCUMENTS

| 7,574,402 B2 * | 8/2009 | Kubo et al. ..................... 705/38 |
| 2005/0144122 A1 * | 6/2005 | Creveling et al. ............... 705/39 |
| 2008/0167000 A1 | 7/2008 | Wentker et al. |
| 2009/0048884 A1 * | 2/2009 | Olives et al. ..................... 705/7 |
| 2012/0084164 A1 | 4/2012 | Hammad |

FOREIGN PATENT DOCUMENTS

| CN | 101097625 A | 1/2008 |
| KR | 10-2011-0055225 A | 5/2011 |
| WO | 02/097685 A1 | 12/2002 |

OTHER PUBLICATIONS

International Search Report and Written Opinion mailed Jan. 24, 2013, PCT Application No. PCT/US2012/045107, 9 pages.

\* cited by examiner

*Primary Examiner* — Samica L Norman
(74) *Attorney, Agent, or Firm* — Kilpatrick Townsend & Stockton LLP

(57) ABSTRACT

Systems and methods for monitoring transaction data and providing an indication regarding a performance parameter to a payment processing entity. Transaction data associated with a plurality of transactions conducted during a time interval is received. A server computer determines that the received transaction data meets a threshold. It is further determined whether a previous indication that the threshold has been met was provided to a payment processing entity, the previous indication being associated with a plurality of previous transactions conducted during a previous time interval. If the previous indication was not provided, an indication that the threshold has been met is provided to the payment processing entity, the indication including information regarding a performance parameter of the payment processing entity.

21 Claims, 11 Drawing Sheets

TRANSACTION DATA TABLE

| Transaction ID 300(a) | Date/Time 300(b) | Account Number 300(c) | Transaction Class 300(d) | Merchant/ATM 300(e) | Acquirer 300(f) | Acquirer Processor 300(g) | Issuer 300(h) | Issuer Processor 300(i) | Authorization Category 300(j) | Error Code 300(k) | Transaction Amount 300(l) |
|---|---|---|---|---|---|---|---|---|---|---|---|
| 345678 | 6/23/12 - 06:30 | 1234567891015620 | Credit | Merchant A | Acquirer X | Processor X | Issuer I | Processor I | Approved | | $52.16 |
| 345679 | 6/23/12 - 06:32 | 1234567891015630 | ATM | ATM 1234 | Acquirer W | Processor W | Issuer II | Processor II | Declined | | |
| 345680 | 6/23/12 - 06:33 | 1234567891015640 | Debit | Merchant A | Acquirer X | Processor X | Issuer I | Processor I | Approved | | $33.83 |
| 345681 | 6/23/12 - 06:34 | 1234567891015650 | Prepaid | Merchant B | Acquirer Y | Processor Y | Issuer III | Processor III | Rejected | A | |
| 345682 | 6/23/12 - 06:36 | 1234567891015660 | Credit | Merchant C | Acquirer Z | Processor Z | Issuer III | Processor III | Rejected | B | |
| 345683 | 6/23/12 - 06:37 | 1234567891015670 | ATM | ATM 5678 | Acquirer W | Processor W | Issuer I | Processor I | Approved | | $22.00 |
| 345684 | 6/23/12 - 06:40 | 1234567891015680 | Prepaid | Merchant A | Acquirer X | Processor X | Issuer II | Processor II | Declined | | |
| 345685 | 6/23/12 - 06:42 | 1234567891015700 | Credit | Merchant C | Acquirer Z | Processor Z | Issuer I | Processor I | Rejected | C | |
| 345686 | 6/23/12 - 06:43 | 1234567891015710 | ATM | ATM 9101 | Acquirer W | Processor W | Issuer I | Processor I | Approved | | $22.00 |
| 345687 | 6/23/12 - 06:44 | 1234567891015720 | Prepaid | Merchant A | Acquirer X | Processor X | Issuer II | Processor II | Declined | | |
| 345688 | 6/23/12 - 06:46 | 1234567891015730 | Credit | Merchant C | Acquirer Z | Processor Z | Issuer I | Processor I | Approved | | $24.23 |

FIG. 3

THRESHOLD DATA TABLE

| Payment Processing Entity 400(a) | Transaction Class 400(b) | Performance Parameter 400(c) | Threshold % 400(d) |
|---|---|---|---|
| Merchant A | Prepaid | Declines | 25% |
| | | Rejects (Error Code A) | 25% |
| | | Rejects (Error Code B) | 15% |
| | Credit | Declines | 25% |
| | | Rejects (Error Code B) | 25% |
| | | Rejects (Error Code C) | 15% |
| | Debit | Declines | 25% |
| | | Rejects (Error Code A) | 25% |
| | | Rejects (Error Code B) | 15% |
| Acquirer X | Credit | Declines | 25% |
| | | Rejects (Error Code A) | 20% |
| | | Rejects (Error Code C) | 10% |
| | ATM | Declines | 15% |
| | | Rejects (Error Code A) | 25% |
| | | Rejects (Error Code C) | 25% |
| Issuer I | Credit | Declines | 20% |
| | | Rejects (Error Code A) | 20% |
| | | Rejects (Error Code B) | 25% |
| | | Rejects (Error Code C) | 15% |
| Processor II | Prepaid | Declines | 25% |
| | | Rejects (Error Code A) | 15% |
| | | Rejects (Error Code C) | 20% |
| | Credit | Declines | 50% |
| | | Rejects (Error Code A) | 25% |

EVENT DATA TABLE

| Payment Processing Entity 500(a) | Time Interval 500(b) | Transaction Class 500(c) | Total Transaction Count 500(d) | Performance Parameter 500(e) | Performance Parameter Count 500(f) | Performance Parameter % 500(g) | Threshold 500(h) | Threshold Met for Time Interval 500(i) | Threshold Met for Previous Time Interval 500(j) | Date/Time of Previous Indication Provided to Entity 500(k) |
|---|---|---|---|---|---|---|---|---|---|---|
| Merchant A | 6/23/12 - 08:30 to 6/23/12 - 08:35 | Prepaid | 120 | Declines | 10 | 8% | 25% | N | N | |
| | | | | Rejects (Error Code A) | 32 | 27% | 25% | Y | N | |
| | | | | Rejects (Error Code B) | 24 | 20% | 15% | Y | Y | 6/23/12 - 07:05 |
| | | Credit | 200 | Declines | 25 | 13% | 25% | N | N | |
| | | | | Rejects (Error Code B) | 55 | 28% | 25% | Y | N | |
| | | | | Rejects (Error Code C) | 48 | 24% | 15% | Y | Y | 6/23/12 - 06:10 |
| | | Debit | 185 | Declines | 18 | 10% | 25% | N | Y | 6/23/12 - 06:30 |
| | | | | Rejects (Error Code A) | 44 | 24% | 25% | N | N | |
| | | | | Rejects (Error Code B) | 22 | 12% | 15% | N | N | |
| Acquirer X | 6/23/12 - 08:30 to 6/23/12 - 08:35 | Credit | 250 | Declines | 22 | 9% | 25% | N | Y | 6/22/12 - 08:00 |
| | | | | Rejects (Error Code A) | 45 | 18% | 20% | N | Y | |
| | | | | Rejects (Error Code C) | 37 | 15% | 10% | Y | N | |
| | | ATM | 150 | Declines | 18 | 12% | 15% | N | N | |
| | | | | Rejects (Error Code A) | 25 | 17% | 25% | N | N | |
| | | | | Rejects (Error Code C) | 33 | 22% | 25% | N | Y | 6/23/12 - 03:15 |
| Issuer I | 6/23/12 - 08:30 to 6/23/12 - 08:35 | Credit | 550 | Declines | 75 | 14% | 20% | N | Y | 6/23/12 - 06:05 |
| | | | | Rejects (Error Code B) | 98 | 18% | 20% | N | Y | 6/23/12 - 02:30 |
| | | | | Rejects (Error Code C) | 75 | 14% | 25% | N | N | |
| Processor II | 6/23/12 - 08:30 to 6/23/12 - 08:35 | Prepaid | 150 | Declines | 49 | 9% | 15% | N | Y | 6/22/12 - 14:10 |
| | | | | Rejects (Error Code A) | 25 | 17% | 25% | N | N | |
| | | | | Rejects (Error Code B) | 18 | 12% | 15% | N | N | |
| | | | | Rejects (Error Code C) | 35 | 23% | 20% | Y | Y | 6/23/12 - 07:45 |
| | | Credit | 225 | Declines | 45 | 20% | 50% | N | Y | 6/23/12 - 07:35 |
| | | | | Rejects (Error Code A) | 22 | 10% | 25% | N | N | |

FIG. 5

PROCESSING MONITOR SYSTEM AND METHOD

CROSS-REFERENCES TO RELATED APPLICATIONS

This application claims the benefit of U.S. Provisional Application No. 61/502,784, filed Jun. 29, 2011, entitled "MERCHANT MONITOR SERVICE," which is herein incorporated by reference in its entirety for all purposes.

BACKGROUND

The processing of electronic payment transactions typically requires coordination between various payment processing entities such as merchants, acquirers, acquirer processors, issuers, issuer processors, and payment processing networks. For example, the authorization of an electronic transaction may involve the exchange of authorization messages amongst the payment processing entities. When a consumer makes a purchase at a merchant using a credit or debit card, the card may be swiped or scanned at an access device such as a point of sale terminal at the merchant location. The terminal may generate an authorization request message that is routed through an acquirer and/or acquirer processor to a payment processing network. If the authorization request message is rejected by the payment processing network, the merchant can be notified and the transaction canceled. If the authorization request message is accepted, the payment processing network can then route the message to an issuer of the consumer's account and/or the issuer's processor. The issuer or processor can then perform a number of authentication, authorization, and fraud detection steps to determine whether to authorize the transaction. Upon making an authorization decision, an authorization response message can be transmitted by the issuer or processor back to the merchant—via the payment processing network and the various payment processing entities—indicating whether the electronic payment transaction is approved or declined.

The payment processing entities that participate in electronic transaction processing may each rely on terminals, server computers, and/or other hardware and software to facilitate the exchange of authorization messages. From time to time, however, hardware and software failures can occur that adversely affect the exchange of authorization messages amongst the payment processing entities. For example, if one or more of the payment processing entities is unable to communicate with the payment processing network or the other processing entities due to a failure, the issuer may not receive the authorization request message, the merchant may not receive the authorization response message, and the electronic transaction may not be completed. Hardware and software failures can also result in authorization messages being generated that contain invalid or corrupted data. Such messages may result in the payment processing network rejecting the message and canceling the transaction, or the issuer declining an otherwise valid and legitimate transaction. The above issues may affect all transactions processed by a particular processing entity. In some circumstances, however, hardware and software failures may result in intermittent issues affecting only certain transactions. Such failures may be more difficult to detect.

Existing computational solutions to the problem of detecting hardware and software failures in electronic payment processing systems are inefficient, memory-intensive, and inaccurate. For example, payment processing entities have historically relied on internal data monitoring mechanisms to detect hardware and software failures affecting their ability to receive, process, and transmit messages relating to electronic payment transactions. As explained above, however, payment processing issues experienced by one processing entity may be related to a hardware or software failure at another processing entity. Thus, some existing solutions require the analysis of transaction data from multiple sources in potentially disparate data formats. The aggregation and normalization of disparate data from multiple payment processing entities can be a time-consuming and memory-intensive process. Moreover, since certain failures result in only intermittent issues and are thus difficult to detect, the data collected and analyzed by existing solutions may not accurately portray the nature and source of the hardware or software failure.

One existing solution involves the monitoring of transactions at a payment processing network to detect an issuer's rejected transactions and other processing issues that may indicate a hardware or software failure at the issuer. If a potential failure is identified, a system operator at the payment processing network is provided with an alert message on a computer screen. This message may prompt the operator to contact the issuer by telephone to bring the potential failure to the issuer's attention. In this solution, however, transactions for other payment processing entities such as merchants, acquirers, and processors are not monitored. Moreover, the alerts provided are continuously generated until the incidence of processing issues for the issuer falls below a baseline level. Such continuous alert generation is computationally inefficient and memory-intensive.

Moreover, payment processing entities typically earn revenue on a per transaction basis, and rejected or declined transactions often result in lost sales to merchants, lost switch fees to payment processing networks, and lost interchange revenue to issuers, acquirers, and processors. In other words, rejected or declined transactions may result in lost revenue for all payment processing entities involved. Thus, it is essential that payment processing entities be made aware of hardware and software problems as soon as possible so that repairs can be made in a timely manner.

Embodiments of the invention address the above problems, and other problems, individually and collectively.

SUMMARY

Embodiments of the invention are related to systems and methods for monitoring transaction data and providing an indication regarding a performance parameter to a payment processing entity.

One embodiment of the invention is directed to a method comprising receiving transaction data associated with a plurality of transactions conducted during a time interval. A server computer determines that the received transaction meets a threshold. It is further determined whether a previous indication that the threshold has been met was provided to a payment processing entity, the previous indication being associated with a plurality of previous transactions conducted during a previous time interval. If the previous indication was not provided, an indication that the threshold has been met is provided to the payment processing entity, the indication including information regarding a performance parameter of the payment processing entity.

Another embodiment of the invention is directed to a server computer comprising a processor and a computer readable medium coupled to the processor. The computer readable medium comprises code executable by a processor for implementing a method comprising receiving transaction data associated with a plurality of transactions conducted during a time interval, determining that the received transaction data meets a threshold, and determining whether a previous indication that the threshold has been met was provided to a payment processing entity, the previous indication being associated with a plurality of previous transactions conducted during a previous time interval. If the previous indication was not provided, an indication that the threshold has been met is provided to the payment processing entity, the indication including information regarding a performance parameter of the payment processing entity.

Another embodiment of the invention is directed to a method comprising transmitting, by a payment processing entity, transaction data associated with a plurality of transactions conducted during a time interval to a server computer associated with a payment processing network. The server computer determines that the transmitted transaction data meets a threshold, and further determines whether a previous indication that the threshold has been met was provided to the payment processing entity, the previous indication being associated with a plurality of previous transactions conducted during a previous time interval. If the previous indication was not provided, an indication that the threshold has been met is received from the server computer, the indication including information regarding a performance parameter of the payment processing entity.

These and other embodiments of the invention are described in further detail below with reference to the Figures and the Detailed Description.

BRIEF DESCRIPTION OF THE DRAWINGS

FIG. 3 shows a transaction data table according to an embodiment of the invention.

FIG. 4 shows a threshold data table according to an embodiment of the invention.

FIG. 5 shows an event data table according to an embodiment of the invention.

DETAILED DESCRIPTION

Figure 1:
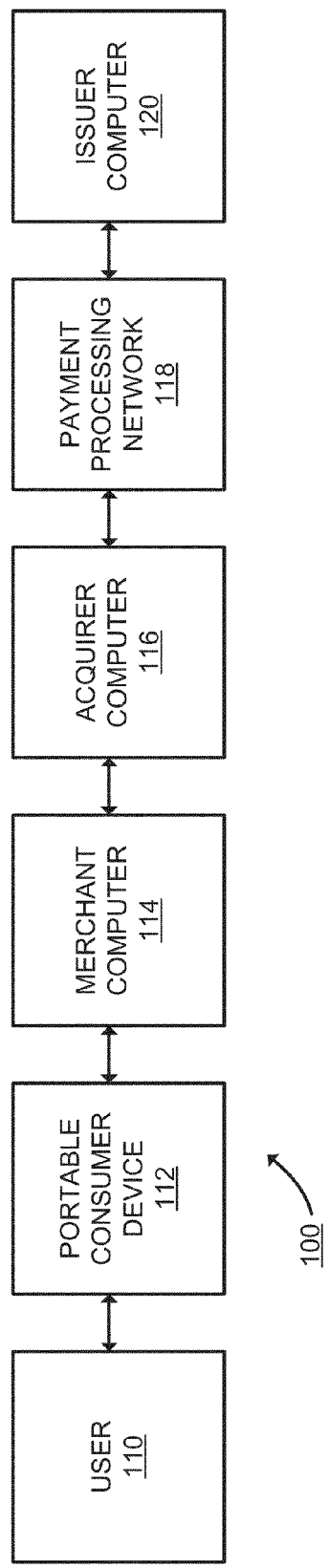
FIG. 1 shows a block diagram of a payment processing system according to an embodiment of the invention.

Prior to discussing embodiments of the invention, a further description of some terms may be helpful in understanding embodiments of the invention.

As used herein, a "transaction" may refer to a purchase of goods and/or services, a withdrawal of funds, an electronic transfer of funds, or any other transaction involving an account associated with a consumer. A transaction can occur at a merchant location (e.g., at the point of sale), at an automated teller machine (ATM), on the Internet, by phone, by mail, or in any other suitable context in which the transaction can be processed electronically.

As used herein, "transaction data" may include data relating to a transaction as contained in an authorization message request message, contained in an authorization response message, and/or generated by the processing of an authorization message. For example, transaction data can include a unique transaction identifier, transaction date and time, account number, transaction class code (e.g., credit, debit, ATM, prepaid, etc.), merchant code (e.g., MW, DBA, etc.), ATM code, acquirer code, acquirer processor code, issuer code (e.g., BIN, etc.), issuer processor code, authorization category code (e.g., approved, declined, rejected, etc.), one or more error codes, transaction amount (e.g., settlement amount), cardholder or account holder information (e.g., name, date of birth, address, phone number, etc.), card verification value (CVV), expiration date, loyalty account information, and other information relating to the transaction.

As used herein, a "payment processing entity" may include a merchant, an acquirer, an acquirer processor, an issuer, an issuer processor, a payment processing network, or any other entity that participates in the processing of electronic payment transactions. As used herein, a "merchant" may be an entity that engages in transactions and can sell goods or services, and as used herein may also include an ATM. An "acquirer" may be a business entity (e.g., a commercial bank) that has a business relationship with a particular merchant or other entity. As used herein, an "issuer" may be a business entity (e.g., a bank) that maintains financial accounts for consumers such as individuals, businesses, and other entities, and that may issue portable consumer devices such as credit and debit cards to consumers. Some entities may perform both issuer and acquirer functions. Embodiments of the invention encompass such single entity issuer-acquirers. As used herein, a "payment processing network" may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transaction, and other types of commercial transactions. VisaNet™, in particular, includes a VIP system (Visa Integrated Payments system) which processes authorization requests and a Base II system which performs clearing and settlement services. As used herein, an "acquirer processor" may be an entity that processes electronic payment transactions on behalf of an acquirer, or that cooperates with an acquirer to process electronic payment transactions. As used herein, an "issuer processor" may be an entity that that processes electronic payment transactions on behalf of an issuer, or that cooperates with an issuer to process electronic payment transactions. An issuer processor may include data processing subsystems, networks, and operations used to support and deliver various services such as network gateway, risk management, program management, authorization, exception file, and clearing and settlement services. An exemplary issuer processor may include Visa DPS™.

As used herein, a "performance parameter" may include a parameter relating to the processing of an electronic transaction that may indicate a potential hardware or software failures at a payment processing entity. For example, performance parameters can include approved transactions, declined transactions, rejected transactions, transaction processing time, transaction processing communication errors, or any other suitable parameter. As used herein, "approved transactions" may include transactions that are authorized by an issuer, payment processing network, or other payment processing entity. As used herein, "declined transactions" may include transactions that are not authorized by an issuer, payment processing network, or other payment processing entity. A transaction may be declined due to insufficient funds in a user's account, insufficient available credit, high risk of fraud, authentication issues such as an invalid Personal Identification Number (PIN), Card Verification Value (CVV), Dynamic Card Verification Value (dCVV), cryptogram, or for other reasons. A transaction may also be declined due to invalid or corrupted transaction data (e.g., an invalid or corrupted transaction ID, date, time, account number, transaction class code, merchant code, ATM code, acquirer code, acquirer processor code, issuer code, issuer processor code, authorization category code, etc.) contained in an authorization message. As used herein, "rejected transactions" may include transactions for which an authorization request message or authorization response message is rejected for one or more reasons by a payment processing network or other payment processing entity. Authorization messages may be rejected for a number of reasons. For example, rejections may occur due to invalid or corrupted transaction data (e.g., an invalid or corrupted transaction ID, date, time, account number, transaction class code, merchant code, ATM code, acquirer code, acquirer processor code, issuer code, issuer processor code, authorization category code, etc.) contained in an authorization message. Rejections may also occur in response to invalid or corrupted authentication data included in the transaction data such as an invalid Personal Identification Number (PIN), Card Verification Value (CVV), Dynamic Card Verification Value (dCVV), cryptogram, or other authentication issues. As used herein, "transaction processing time" may include the time required to process a transaction (i.e. the time that lapses from the transmission of an authorization request message to the receipt of an authorization response message at a merchant or ATM). Transaction processing time may also include the interval of time associated with exchanging an authorization message between two or more payment processing entities. As used herein, "transaction processing communication errors" may include any issue adversely affecting the ability of a payment processing entity to send or receive authorization messages.

As used herein, an "indication" may include an alert, e-mail, text message, report, or any other electronic communication that provides a payment processing entity with information regarding a performance parameter as defined above.

As used herein, an "authorization request message" may refer to a data message, or sequence of data messages, that requests an issuer of a payment account to authorize a transaction. An authorization request message according to an embodiment of the invention may comply with ISO (International Organization for Standardization) 8583, which is a standard for systems that exchange electronic transactions made by cardholders using payment cards. An authorization request message according to other embodiments may comply with other suitable standards.

As used herein, an "authorization response message" may refer to a data message, or sequence of data messages, that responds to a merchant's and/or acquirer's request to authorize a transaction. An authorization response message according to an embodiment of the invention may comply with ISO 8583, which, as described above, is a standard for systems that exchange electronic transactions made by cardholders using payment cards. An authorization response message according to other embodiments may comply with other suitable standards.

As used herein, a "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to one or more databases and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

Embodiments of the invention are related to systems and methods for monitoring transaction data and providing an indication regarding a performance parameter to a payment processing entity. As explained herein, received transaction data can be analyzed by a server computer to determine whether a threshold is met. If the threshold is met, an indication can be transmitted to the payment processing entity including information regarding the performance parameter.

To illustrate, when a user makes a purchase at a merchant using a portable consumer device (e.g., a credit card, debit card, etc.), the user may swipe their device at the merchant's POS terminal. If the transaction is a debit transaction, the user may also enter a personal identification number (PIN) at the POS terminal. The terminal may then transmit an authorization request message to an acquirer, the message including the user's PIN and other transaction data read from the user's device. The acquirer may then route the authorization request message to a payment processing network which may forward the message to an issuer. The issuer may then perform a number of authorization, authentication, and fraud detection steps to make a decision regarding whether the transaction is to be approved. If, for example, the PIN provided by the user is invalid, or if the PIN was entered correctly by the user but transmitted incorrectly due to a hardware or software problem with the merchant's POS terminal, the transaction may be declined. The issuer may then transmit an authorization response message to the payment processing network indicating that the transaction is not authorized. The payment processing network may then transmit the authorization response message to the acquirer for forwarding back to the merchant.

The payment processing network may store a record of the declined transaction in a database that also includes records for a number of previous transactions conducted at the merchant and processed by the payment processing network. Periodically, the payment processing network may analyze the stored transaction records against one or more thresholds. For example, the merchant may have established a threshold of 25% for transactions declined due to an invalid PIN. Every 5 minutes, for example, the payment processing network may analyze the merchant's transaction records to determine how many of the merchant's transactions conducted in the last 5 minute time interval were declined due to an invalid PIN code. If the stored records for the merchant indicate that 10 transactions have been conducted at the merchant in the last 5 minute time interval, and that 3 of the transactions (i.e. 30%) have been declined due to an invalid PIN, the payment processing network may transmit an indication (e.g., an e-mail alert) to the merchant indicating that the threshold for transactions declined due to an invalid PIN has been met. Such an alert may prompt the merchant to investigate possible hardware or software issues associated with the POS terminal that may be the source of the high occurrence of declined transactions. However, once the merchant has been notified of the problem, the merchant may not want to receive redundant alerts every 5 minutes indicating that the same problem is being detected by the payment processing network. Thus, if the payment processing network determines that the 25% threshold is met by declined transactions conducted during subsequent 5 minute time intervals, the payment processing network may decide not to send further alerts. Once the payment processing network determines that subsequent transactions do not meet the 25% threshold, however, the payment processing network may transmit an alert to the merchant indicating that the threshold is no longer met, and that the problem appears to have been resolved.

In another illustration, upon receiving the authorization request message described above, the payment processing network may forward the message to the issuer and wait for an authorization response message from the issuer. If no response is received from the issuer after a determined period of time, the payment processing network may cancel the transaction and transmit a message to the merchant (via the acquirer) indicating that the transaction is canceled due to communication issues with the issuer. The payment processing network may store a record of the transaction in a database that also includes records for a number of previous transactions involving accounts associated with the issuer and processed by the payment processing network. Periodically, the payment processing network may analyze the stored transaction records against one or more thresholds. For example, the issuer may have established a threshold of 10% for transactions for which an authorization response message is not received by the payment processing network. Every 2 minutes, for example, the payment processing network may analyze the issuer's transaction records to determine how many of the issuer's transactions conducted in the last 2 minute time interval did not result in an authorization response message being received by the payment processing network. If the stored records for the issuer indicate that 10 transactions have been attempted on the issuer's accounts in a 2 minute interval, and that 2 of the transactions (i.e. 20%) have been canceled due to communication issues with the issuer, the payment processing network may transmit an indication (e.g., an e-mail alert) to the issuer indicating that the threshold for transactions canceled due to communication issues has been met. The issuer may then investigate the source of the communication problem. If, however, the payment processing network determines that an alert was previously sent to the issuer due to canceled transactions in a previous time interval meeting the 10% threshold, the payment processing network may decide not to send a redundant alert regarding the same issue. Instead, a further alert can be sent indicating that the problem appears to be resolved once the payment processing network determines that transactions in a subsequent time interval do not meet the 10% threshold.

I. Exemplary Systems

FIG. 1 shows a block diagram of a payment processing system 100 that may be used in an embodiment of the invention. System 100 may include a user 110, a portable consumer device 112, a merchant computer 114, an acquirer computer 116, a payment processing network 118, and an issuer computer 120. System 100 may also include an acquirer processor and/or an issuer processor (not shown).

The user 110 may be an individual, or an organization such as a business that is capable of purchasing goods or services. The user 110 may be a merchant, an employee of the merchant, or any other individual who has access to the portable consumer device 112.

The portable consumer device 112 may be in any suitable form. For example, suitable portable consumer devices may be hand-held and compact so that it can fit into a user's wallet and/or pocket (e.g., pocket-sized). The portable consumer device 112 may include a processor, and memory, input devices, and output devices, operatively coupled to the processor. Specific examples of portable consumer devices include cellular or wireless phones, personal digital assistants (PDAs), pagers, portable computers, smart cards, and the like. The portable consumer device 112 can also be a debit device (e.g., a debit card), credit device (e.g., a credit card), or stored value device (e.g., a pre-paid or stored value card).

The merchant computer 114 may also have, or may receive communications from, an access device that can interact with the portable consumer device 112. The access devices may be in any suitable form. Examples of access devices include point of sale (POS) devices, cellular phones, PDAs, personal computers (PCs), tablet PCs, handheld specialized readers, set-top boxes, electronic cash registers, ATMs, virtual cash registers, kiosks, security systems, access systems, and the like.

If the access device is a point of sale terminal, any suitable point of sale terminal may be used including card or phone readers. The card or phone readers may include any suitable contact or contactless mode of operation. For example, exemplary readers can include RF (radio frequency) antennas, magnetic stripe readers, etc. to interact with the portable consumer device 112.

In a purchase transaction, the user 110 may purchase goods or services at a merchant using a portable consumer device 112 such as a credit card, debit card, prepaid card, etc. The user's portable consumer device 112 may interact with an access device such as a POS terminal at the merchant. For example, the user 110 may take a debit card and swipe it though an appropriate slot in the POS terminal. Alternatively, the POS terminal may be a contactless reader, and the portable device 112 may be a contactless device such as a contactless card or phone. For example, the user 110 may take a contactless card or a phone and pass it in front of the contactless reader to transmit financial information stored on the device.

An authorization request message may be transmitted from the merchant computer 114 to the acquirer computer 116. After receiving the authorization request message, the acquirer computer 116 may then transmit the authorization request message to a payment processing network 118. The payment processing network 118 may then either reject the authorization request message and cancel the transaction, or accept the authorization request message and forward it to an issuer computer 120 associated with the portable consumer device 112.

After receiving the authorization request message, the issuer computer 120 may perform a number of authorization, authentication, and fraud detection processes in order to make an authorization decision. The issuer computer 120 may then generate and send an authorization response message to the payment processing network 118 indicating whether or not the transaction is approved. The payment processing network 118 may transmit the authorization response message to the acquirer computer 116 which may then transmit the authorization response message back to the merchant computer 114.

After the merchant computer 114 receives the authorization response message, the access device communicatively connected to the merchant computer 114 may provide the authorization response message to the user 110. The authorization response message may be displayed by the POS terminal, or may be printed out on a receipt.

Although the transaction described above is in the context of a purchase transaction involving a merchant, the transaction may also be an automated teller machine (ATM) transaction. Thus, the merchant computer 114 as shown in FIG. 1 and described herein may alternatively include an ATM.

At the end of the day, a normal clearing and settlement process may be conducted by the payment processing network 118 in cooperation with the issuer computer 120 and acquirer computer 116. A clearing process can be a process of exchanging financial details between an acquirer and an issuer to facilitate posting to a consumer's account and reconciliation of the consumer's settlement position. A settlement process can be a process of transferring funds between an acquirer and issuer. In some embodiments, authorization and settlement can occur simultaneously.

As described herein, the payment processing network 118 can store a record of the transaction including transaction data contained in the authorization request and response messages. The stored transaction data can also include error codes generated by the payment processing network 118 or included in the authorization messages. The above purchase transaction can be repeated, and transactions can be conducted by a plurality of users utilizing a plurality of merchants, acquirers, issuer, and processors. Transactions can also be conducted using other payment processing networks in communication with the payment processing network 118. Thus, the payment processing network 118 can store transaction data for a plurality of transactions involving a plurality of users, merchants, acquirers, issuers, processors, and payment processing networks. The components and functionalities of a payment processing system 200 according to various embodiments of the invention are described in further detail below.

Figure 2:
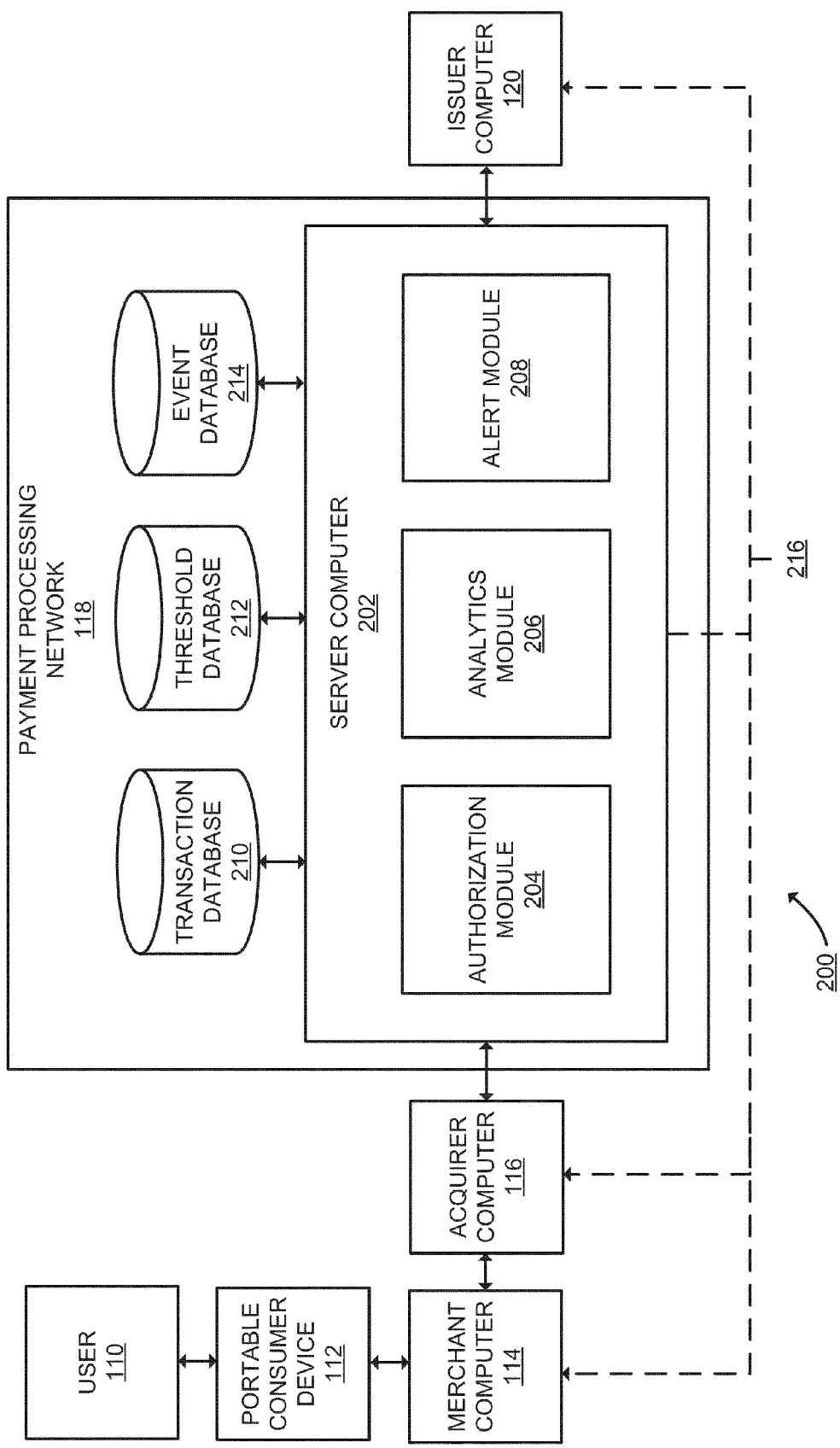
FIG. 2 shows a block diagram of a payment processing system according to an embodiment of the invention.

FIG. 2 shows a block diagram of a payment processing system 200 that may be used in an embodiment of the invention. For simplicity of discussion, only one of each component is shown for several of the components. It is to be understood, however, that embodiments of the invention may include more than one of each component. In addition, some embodiments of the invention may include fewer than all of the components shown in FIG. 2. The various modules and databases in FIG. 2 may each be located within the payment processing network 118, outside the payment processing network 118, and/or distributed at different locations. Further, the components in FIG. 2 may communicate via any suitable communication medium such as the Internet using any suitable communication protocol.

System 200 may include the merchant computer 114 and the acquirer computer 116 communicatively coupled to the merchant computer 114. The user 110 may purchase goods or services at a merchant associated with the merchant computer 114 using the portable consumer device 110. The acquirer computer 116 may communicate with the payment processing network 118 which may be in communication with the issuer computer 120 associated with an issuer of the portable consumer device 112. System 200 may also include an acquirer processor computer and an issuer processor computer (not shown) associated with an acquire processor and issuer processor, respectively.

As shown in FIG. 2, the payment processing network 118 may include a server computer 202 comprising an authorization module 204, an analytics module 206, and an alert module 208. The various modules may be embodied by computer code residing on a computer readable medium. The server computer 202 may be in communication with the issuer computer 120 and the acquirer computer 116 by one or more communication channels. For example, authorization, clearing and settlement messages may be exchanged via any suitable communication medium such as the Internet using any suitable communication protocol. In some embodiments of the invention, an alternate communication channel 216 may be used to transmit indications to the various payment processing entities. The alternative communication channel 216 may include the Internet, a telecommunications network, or any other suitable communication medium using any suitable communication protocol.

The server computer 202 may be operatively coupled to one or more databases, including a transaction database 210, a threshold database 212, and an event database 214.

The authorization module 204 may perform a number of functions related to receiving and forwarding authorization request and authorization response messages. Upon receiving an authorization request message from the acquirer computer 116, the authorization module 204 may forward the authorization request message to the issuer computer 120. Upon receiving an authorization response message from the issuer computer 120, the authorization module 204 may transmit the authorization response message to the acquirer computer 116. The authorization module 204 may also extract transaction data from authorization request and response messages and transmit the extracted data to the transaction database 210 for storage as a transaction record.

Error codes may be generated by the authorization module 204 if, for example, an authorization message is rejected by the authorization module 204. For example, rejections may occur due to invalid or corrupted transaction data (e.g., an invalid or corrupted transaction ID, date, time, account number, transaction class code, merchant code, ATM code, acquirer code, acquirer processor code, issuer code, issuer processor code, authorization category code, etc.) contained in an authorization message. Rejections may also occur in response to invalid or corrupted authentication data included in the transaction data such as an invalid Personal Identification Number (PIN), Card Verification Value (CVV), Dynamic Card Verification Value (dCVV), cryptogram, or other authentication data. The authorization module 204 may include such error codes in the transaction data stored in the transaction database 210. Transaction processing communication errors may also result in the generation of an error code. For example, if the server computer 202 is unable to communicate with one or more of the various payment processing entities (e.g., if an expected response is not received after a determined period of time), the authorization module 204 may generate an appropriate error code for inclusion in the transaction data stored in the transaction database 210. The authorization module 204 may also determine transaction processing time details based upon time stamps included in authorization messages, and include such details in the stored transaction data.

The analytics module 206 may perform a number of functions related to analyzing transaction data to determine whether a threshold has been met. For example, the analytics module 206 can periodically (e.g., every 30 seconds, 1 minute, 5 minutes, 10 minutes, 30 minutes, hour, 12 hours, daily, weekly, etc.) access the transaction data stored in the transaction database 210 and compare the transaction data with threshold data stored for the various payment processing entities in the threshold database 212. If the analytics module 206 determines that a threshold has been met, the analytics module 206 may create (or update) an event record including the event data for the payment processing entity in the event database 214. To determine whether to send an indication that the threshold has been met to the payment processing entity, the analytics module 206 may determine from the event record whether an indication that the threshold has been met was previously sent to the payment processing entity. If no such indication was previously sent, the analytics module 206 may transmit the event data to the alert module 208 for providing an indication to the payment processing entity that the threshold is now met. Alternatively, if the analytics module 206 determines that the threshold has not been met, the analytics module 206 may determine from the event record whether an indication that the threshold has been met (e.g., that the threshold was previously met) was previously sent to the payment processing entity. If such an indication was previously sent, the analytics module 206 may transmit the event data to the alert module 208 for providing an indication to the payment processing entity that the threshold is no longer met.

The alert module 208 may perform a number of functions relating to transmitting an indication that a threshold has been met to a payment processing entity. For example, upon receiving event data from the analytics module 206 (and/or retrieving event data from event database 214), the alert module 208 may generate and send an indication that a threshold has (or has not been) met to the payment processing entity. The indication can include information regarding a performance parameter of the payment processing entity, and can be transmitted in any suitable electronic form such as an e-mail message, text message, etc. The indication can be transmitted by the alert module 208 over the same communication channel used to exchange authorization messages, or can be transmitted over the alternative communication channel 216.

As explained above, the transaction database 210 may store transaction data including data extracted from authorization messages, error codes generated by the authorization module 204, transaction processing time details, and other information. In embodiments of the invention, the transaction data may be stored in the transaction database 210 in the form of transaction data tables.

FIG. 3 shows a transaction data table 300 as stored in the transaction database 210 according to an embodiment of the invention. As seen in FIG. 3, the transaction data table 300 may include various data fields including transaction data. For example, for individual transactions, the transaction data table 300 may include a Transaction ID Field 300(*a*) including a unique identifier for the transaction, a Date/Time Field 300(*b*) including the date and time of the transaction, an Account Number Field 300(*c*) including the account number (or an encrypted account number) used in the transaction (e.g., a credit, debit, ATM, or prepaid account number), a Transaction Class Field 300(*d*) including a code identifying the transaction as a credit, debit, prepaid, or ATM transaction, or other type of transaction, a Merchant/ATM Field 300(*e*) including a code identifying a merchant (e.g., MVV, DBA, etc.) or an ATM involved in the transaction, an Acquirer Field 300(*f*) including a code identifying an acquirer involved in the transaction, an acquirer processor Field 300(*g*) including a code identifying an acquirer processor involved in the transaction, an Issuer Field 300(*h*) including a code identifying an issuer used in the transaction, an Issuer Processor Field 300(*i*) including a code identifying an issuer processor involved in the transaction, an Authorization Category Field 300(*j*) including a code identifying the authorization category (e.g., approved, declined, rejected, etc.) of the transaction, an Error Code Field 300(*k*) including a code identifying an error associated including the processing of the transaction, and a Transaction Amount Field 300(*l*) including the amount of the transaction if successfully processed. Transaction data table 300 can include other fields including additional information such as cardholder or account holder information (e.g., name, date of birth, address, phone number, etc.), card verification value (CVV), expiration date, loyalty account information, and other information relating to the transaction. Any suitable combination of the fields shown in transaction data table 300 may be used, and more, less, or different fields can be included according to embodiments of the invention.

The threshold database 212 may store thresholds for the various payment processing entities as threshold data. The threshold data may include values relating to the percentage of overall transactions associated with one or more performance parameters such as approved transactions, declined transactions, rejected transactions, transaction processing time, transaction processing communication errors, etc. The threshold values may be selected by the payment processing entities and/or may be based on industry best practices, recommendations provided by the payment processing network 118, etc. In some embodiments of the invention, the threshold values may relate to payment processing statistics for peer entities. For example, an acquirer may want to know if their transactions are being declined at a higher rate than the transactions of other acquirers. Thus, payment processing entities may establish dynamic thresholds that relate to a comparison of their performance parameters with other similarly situated entities. In embodiments of the invention, the threshold data stored in the threshold database 212 may be customizable by the payment processing entities. For example, a payment processing entity may access a web interface to select threshold values, the particular performance parameters for which the entity wants to receive indications, the types of transaction classes to be monitored, etc. In embodiments of the invention, the threshold data may be stored in the threshold database 212 in the form of threshold data tables.

FIG. 4 shows a threshold data table 400 as stored in the threshold database 212 according to an embodiment of the invention. As seen in FIG. 4, the threshold data table 400 may include various data fields including threshold data. For example, for individual payment processing entities, the threshold data table 400 may include a Payment Processing Entity Field 400(*a*) including a code identifying the payment processing entity (e.g., merchant code, acquirer code, acquirer processor code, issuer code, issuer processor code, etc.), a Transaction Class Field 400(*b*) including codes identifying one or more transaction classes (e.g., credit, debit, prepaid, ATM, etc.), a Performance Parameter Field 400(*c*) including one or more codes identifying performance parameters (e.g., approvals, declines, rejects, etc.) for each of the selected transaction classes, a Threshold % Field 400(*d*) including a threshold value for each of the selected performance parameters, and any other suitable data field. Any suitable combination of the fields shown in threshold data table 400 may be used, and more, less, or different fields can be included according to embodiments of the invention.

As explained above, the event database 214 may store event data for the various payment processing entities. The event data may be include transaction data for transactions conducted during specific time intervals, threshold data, and details regarding the transmission of indications to the various payment processing entities. In embodiments of the invention, the event data may be stored by the analytics module 206 in the event database 214 and in the form of event data tables.

FIG. 5 shows an event data table 500 as stored in the event database 214 according to an embodiment of the invention. As seen in FIG. 5, the event data table 500 may include various data fields including event data. For example, for individual payment processing entities, the event data table 500 may include a Payment Processing Entity Field 500(*a*) including a code identifying the payment processing entity (e.g., merchant code, acquirer code, acquirer processor code, issuer code, issuer processor code, etc.), a Time Interval Field 500(*b*) including the current interval of time for which transaction data was analyzed, a Transaction Class Field 500(*c*) including codes identifying one or more transaction classes (e.g., credit, debit, prepaid, ATM, etc.), a Total Transaction Count Field 500(*d*) including the total number of transactions for each selected transaction class during the time interval, a Performance Parameter Field 500(*e*) including one or more codes identifying performance parameters (e.g., approvals, declines, rejects, etc.) for each of the selected transaction classes, a Performance Parameter Count Field 500(*f*) including the total number of transactions associated with each of the performance parameters during the time interval and for each selected transaction class, a Performance Parameter % Field 500(*g*) including the percentage of transactions associated with each of the performance parameters during the time interval and for each selected transaction class, a Threshold % Field 500(*h*) including threshold values for each of the selected performance parameters as stored in the threshold database 212 for the payment processing entities, a Threshold Met for Time Interval Field 500(*i*) including a code identifying whether a threshold has been met for transactions conducted during the current interval of time, a Threshold Met for Previous Time Interval Field 500(*j*) including a code identifying whether a threshold was met for previous transactions conducted during a previous interval of time (e.g., whether an indication was previously provided to a payment processing entity, a Date/Time of Previous Indication Provided to Entity Field 500(*k*) including the date and time that an indication was previously provided to a payment processing entity, and any other suitable data field. Any suitable combination of the fields shown in event data table 500 may be used, and more, less, or different fields can be included according to embodiments of the invention.

Figure 6:
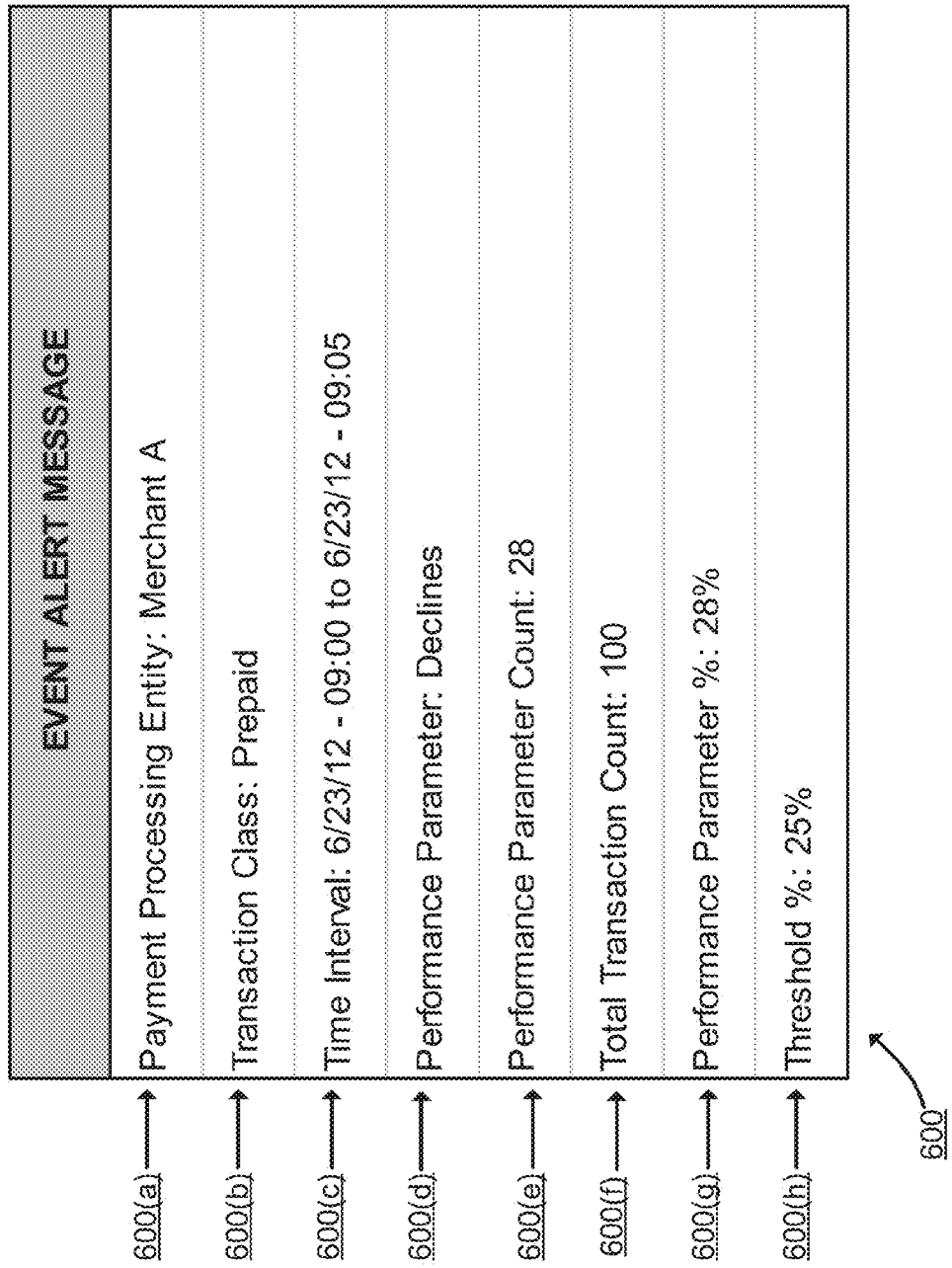
FIG. 6 shows an event alert message according to an embodiment of the invention.

Upon a determination by the analytics module 206 that an indication is to be sent to a payment processing entity, the alert module 208 may generate the indication to include event data stored in event database 214 and/or as provided by analytics module 206. If the analytics module 206 determines that a threshold has been met for a payment processing entity (e.g., that the Performance Parameter % value 500(*g*) in event data table 500 is equal or greater than the Threshold % value 500(*h*)), and that a previous indication of the met threshold has not been sent (e.g., that the Threshold Met for Previous Time Interval Field 500(*j*) in event data table 500 indicates that no previous indication was sent), then the alert module 208 may send the indication to the payment processing entity in the form of an event alert message as shown in FIG. 6. Upon sending the indication, alert module 208 may update the data in the Alert Previously Submitted Field 500(*i*) to indicate that an alert was previously sent to the payment processing entity.

In an embodiment of the invention, upon a determination that a threshold has been met and that a previous indication was not provided, an indication can be provided to the payment processing entity in the form of an event alert message 600 as shown in FIG. 6. As seen in FIG. 6, the event alert message 600 may include information describing the identity of the recipient payment processing entity 600(*a*), the selected transaction class for which the threshold was exceeded 600(*b*), the time interval during which transaction data was analyzed 600(*c*), the selected performance parameter 600(*d*), the total number of transactions associated with the selected performance parameter 600(*e*), the total number of transactions for the selected class during the time interval 600(*f*), a percentage of transactions associated with the selected performance parameter during the time interval and for the selected transaction class 600(*g*), the stored threshold value for the selected performance parameter 600(*h*), and other information. In embodiments of the invention, more, less, or different information can be included in the event alert message 600.

If the analytics module 206 determines that a threshold has not been met for a payment processing entity (e.g., that the Performance Parameter % value 500(*g*) in event data table 500 is less than the Threshold % value 500(*h*)), but also determines that an indication that the threshold was previously met was transmitted to the payment processing entity (e.g., that the Threshold Met for Previous Time Interval Field 500(*j*) in event data table 500 indicates that a previous indication was sent), then the alert module 208 may send an indication to the payment processing entity that the threshold is no longer met. The indication may be in the form of an event completion message as shown in FIG. 7.

Figure 7:
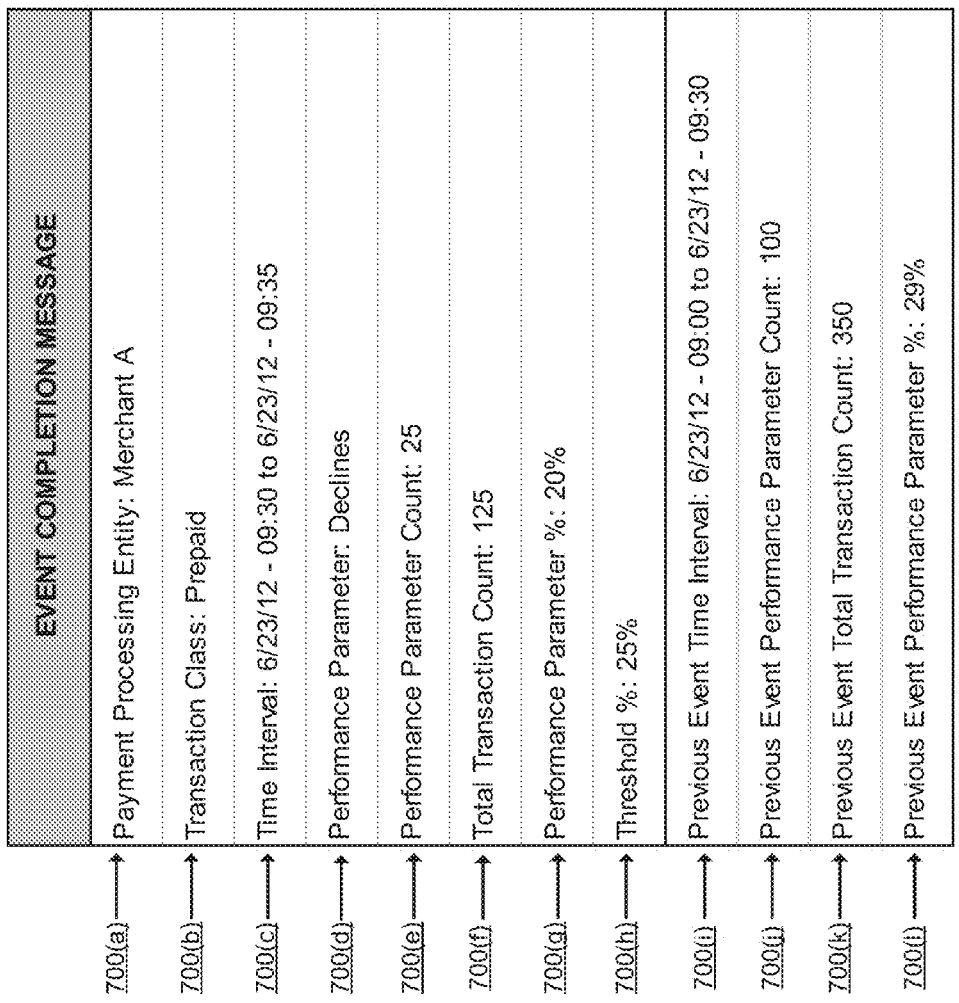
FIG. 7 shows an event completion message according to an embodiment of the invention.

In an embodiment of the invention, upon a determination that a threshold has not been met and that a previous indication was provided, an indication can be provided to the payment processing entity in the form of an event completion message 700 as shown in FIG. 7. As seen in FIG. 7, the event completion message 700 may include information describing the identity of the recipient payment processing entity 700(*a*), the selected transaction class for which the threshold is no longer exceeded 700(*b*), the time interval during which transaction data was analyzed 700(*c*), the selected performance parameter 700(*d*), the total number of transactions associated with the selected performance parameter 700(*e*), the total number of transactions for the selected class during the time interval 700(*f*), the percentage of transactions associated with the selected performance parameter during the time interval and for the selected transaction class 700(*g*), the stored threshold value for the selected performance parameter 700(*h*), and other information. The event completion message 700 may also include information summarizing the previous event. For example, as seen in FIG. 7, the event completion may include information describing the cumulative interval of time during which the threshold was exceeded for the selected performance parameter 700(*i*), the total number of transactions associated with the performance parameter during the cumulative time interval 700(*j*), the total number of transactions for the selected class during the cumulative time interval 700(*k*), the percentage of transactions associated with selected performance parameter during the cumulative time interval and for the selected class 700(*l*), and other information. In embodiments of the invention, more, less, or different information can be included in the event completion message 700.

In embodiments of the invention, the level of detail included in the various indications sent to the payment processing entities may vary. For example, a payment processing entity may customize the types of information provided by the alert module 208 by accessing a web interface and selecting a preferred level of detail. Entity preferences may be stored in any of the databases shown in FIG. 2, or in any other suitable database communicatively coupled to the server computer 202.

Transaction data can be analyzed, thresholds established, and indications provided to payment processing entities at many different levels of detail. In embodiments of the invention, acquirers and issuers may use different processors for different classes of transactions or geographic regions. For example, an acquirer may use one acquirer processor for credit transactions and a different acquirer processor for debit transactions. Similarly, an issuer processor may use one issuer processor for credit transactions and a different issuer processor for debit transactions. In another example, acquirers or issuers may use one processor for transactions conducted in a particular geographic region and a different processor for transactions conducted in another geographic region. Thus, the transaction data stored in the transaction database 210, the threshold data stored in the threshold database 212, and/or the event data stored in the event database 214 may include details at the individual processor or geographic level. For example, a payment processing entity may select specific thresholds for transactions processed by particular issuer or acquirer processors, and/or for transactions conducted in particular geographic regions. The indications generated by the alert module 208 (e.g., the event alert message 600 of FIG. 6 and the event completion message 700 of FIG. 7) may include information at the processor and/or geographic level. In some embodiments of the invention, the server computer 202 of the payment processing network 118 may comprise multiple server computers located at different locations (e.g., processing centers). For example, each server computer may be in communication with a separate set of databases such as those shown in FIG. 2. The data stored in these databases may be redundant across the various processing centers or non-redundant in embodiments of the invention. In either case, the stored transaction data, threshold data, and/or event data may include details at the individual processing center level (e.g., processing center codes). Thus, the indications generated by the alert module 208 may also include information at the processing center level.

II. Exemplary Methods

Figure 8:
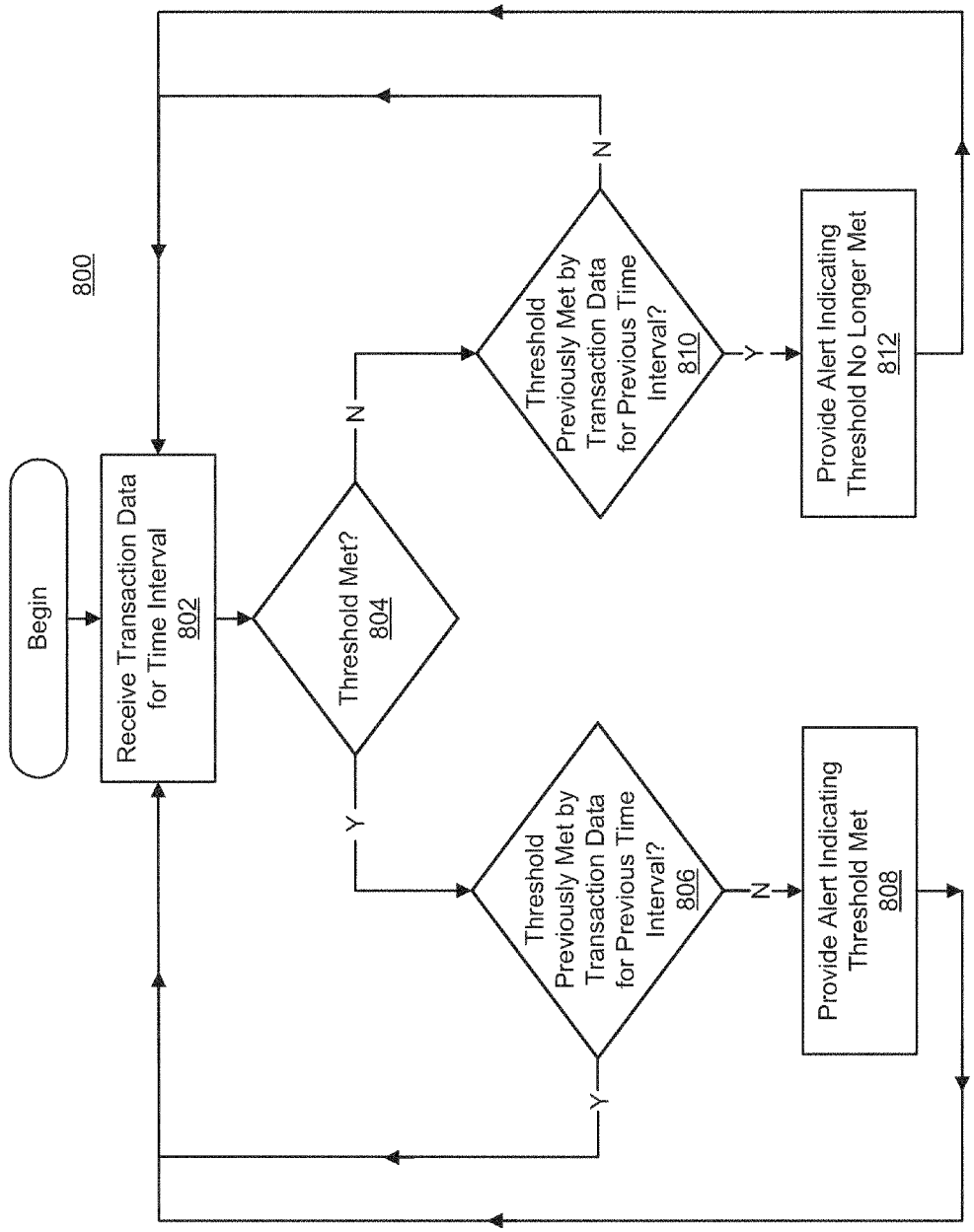
FIG. 8 illustrates a flow diagram showing a method for monitoring transaction data and providing an indication regarding a performance parameter to a payment processing entity according to an embodiment of the invention.

FIG. 8 illustrates a flow diagram showing a method 800 for monitoring transaction data and providing an indication regarding a performance parameter to a payment processing entity according to an embodiment of the invention. The steps performed in the method 800 can be performed, for example, by the server computer 202 shown in FIG. 2. In other embodiments of the invention, one or more steps of the method 800 may be performed by any other suitable computer system, such as the issuer computer 120, acquirer computer 116, an issuer processor computer, an acquirer processor computer, or other suitable computer system.

At step 802, the method 800 may begin by the server computer 202 receiving transaction data associated with a plurality of transactions conducted during a time interval. The time interval can be a predetermined increment of time, and can be established by the payment processing network or any of the other payment processing entities. As described herein, the transaction data may comprise data contained in authorization request messages received from the acquirer computer 116, data contained in an authorization response messages received from the issuer computer 120, error codes generated by the server computer 202 in response to rejected authorization messages, error codes generated by the server computer 202 in response to transaction processing communication errors with one or more of the payment processing entities involved in the transaction, information regarding transaction processing time for transactions, and other transaction data. Upon receipt, the transaction data may be stored by authorization module 204 in transaction database 210. To illustrate, the transaction data received by the server computer 202 may indicate that a merchant has conducted 100 transactions in the last 5 minutes, and that 28 of the transactions were declined by issuers due to an invalid PIN code being transmitted with the authorization request messages. Upon receipt of the transaction data, the method 800 can then proceed to decision 804.

At decision 804, the analytics module 206 may determine whether the received transaction data meets a threshold. For example, the analytics module 206 can periodically access the transaction data stored in the transaction database 210 and compare the transaction data against the threshold data stored in the threshold database 212. As described herein, the thresholds may be predetermined and the threshold data may include values relating to the percentage of overall transactions associated with one or more performance parameters such as approved transactions, declined transactions, rejected transactions, transaction processing time, transaction processing communication errors, etc. The threshold values may be selected by the payment processing entities and/or may be based on industry best practices, recommendations provided by the payment processing network 118, etc. In some embodiments of the invention, the threshold values may be dynamic and relate to payment processing statistics for peer entities. In embodiments of the invention, the threshold data stored in the threshold database 212 may be customizable by the payment processing entities. For example, a payment processing entity may access a web interface to select threshold values, the particular performance parameters for which the entity wants to receive indications, the types of transaction classes to be monitored, etc. At decision 804, the analytics module 206 may compare received transaction data to the stored thresholds for the payment processing entities. For example, referring back to the above illustration, the merchant may have established a threshold of 25% for transactions declined due to an invalid PIN, and the analytics module 206 may compare the merchant's transaction data with the stored threshold to determine that 28 of the merchant's 100 transactions (e.g., 28%) were declined due to an invalid PIN in the last 5 minutes, and that the merchant's 25% threshold has therefore been met. Upon determining that the threshold has been met, the method 800 may proceed to decision 806.

The analytics module 206, at decision 806, may determine whether the threshold was previously met by transaction data received for transactions conducted during a previous time interval, and thus whether an indication was already provided to the payment processing entity. For example, the analytics module 206 may access the event data stored in the event database 214 to determine whether the threshold was previously met, and thus whether an indication (e.g., event alert message 600 of FIG. 6) was previously provided to the payment processing entity. Referring back to the above illustration, the analytics module 206 may determine that more than 25% of the merchant's previous transactions, conducted during the previous time interval, were declined by issuers due to an invalid PIN. As described herein, the merchant may not want to receive redundant event alert messages regarding the high occurrence of invalid PIN entries since the merchant is already aware of the issue, and the payment processing network may not want to generate redundant event alert messages since this is computationally inefficient. As such, once it is determined by the analytics module 206 that the 25% threshold was met by previous declined transactions, and that an event alert message was already transmitted to the merchant, the analytics module 206 may not send a further alert regarding the same issue. The method 800 may then return to step 802 wherein transaction data for subsequent transactions (i.e. for transactions conducted during subsequent time intervals) may be received by the server computer 202 and analyzed. If it is determined, however, that a previous indication was not transmitted to the payment processing entity, then the method may proceed to step 808.

At step 808, the alert module 208 may transmit an indication that the threshold has been met to the payment processing entity, the indication including information regarding the performance parameter of the payment processing entity. For example, referring back to the above illustration, the alert module 208 may transmit an indication (e.g., the event alert message 600 of FIG. 6) to the merchant. As shown in FIG. 6, the event alert message 600 may inform the merchant that in the current 5 minute time interval, 28 of the merchant's 100 transactions (i.e. 28%) were declined by issuers due to an invalid PIN, and that this met the merchant's established threshold of 25%. In response to receiving the event alert message 600, the merchant may be able to investigate whether the high occurrence of declined transactions is due to hardware and/or software issues, and make any needed repairs in a timely manner. Upon sending the indication, the alert module 208 (or analytics module 206) may update the event data for the payment processing entity stored in the event database 214 to reflect that the indication was transmitted to the payment processing entity (e.g., Field 500(*j*) of Event Data Table 500 shown in FIG. 5), thereby preventing redundant indications from being transmitted for transactions conducted during subsequent time intervals. Upon sending the indication and updating the event data for the payment processing entity, the method 800 may then return to step 802 wherein transaction data for subsequent transactions (i.e. for transactions conducted during subsequent time intervals) may be received by the server computer 202 and analyzed.

Returning to decision 804, upon receiving the transaction data for the plurality of transactions conducted during the current time interval, the analytics module 206 may alternatively determine that the threshold is not met. For example, referring back to the above illustration, the transaction data received by the server computer 202 may instead indicate the merchant has conducted 125 transactions in the last 5 minutes, and that 25 of the transactions (e.g., 20%) were declined by issuer due to an invalid PIN code being transmitted with the authorization request message. The analytics module 206 may compare this transaction data with the merchant's established threshold of 25%, and determine that the threshold is not met. Once it is determined that the received transaction data does not meet the threshold, the method 800 may proceed to decision 810.

At decision 810, the analytics module 206 may determine whether the threshold was previously met by transaction data received for transactions conducted during a previous time interval, and thus whether an indication was previously provided to the payment processing entity. For example, the analytics module 206 may access the event data stored in the event database 214 to determine whether the threshold was previously met, and thus whether an indication (e.g., event alert message 600 of FIG. 6) was previously provided to the payment processing entity. For example, referring back to the above illustration, the analytics module 206 may determine that the merchant's 25% threshold was not previously met by transaction data for transactions conducted during a previous time interval. Since the merchant's threshold was not met for transactions conducted during the current or previous time interval, the alert module 208 may send no indication to the merchant regarding transactions declined due to PIN entry errors, and the method 800 may return to step 802 wherein transaction data for subsequent transactions may be received by the server computer 202 and analyzed.

At decision 810, the analytics module 206 may alternatively determine that the threshold was previously met by transaction data received for transactions conducted during a previous time interval, and that that an indication was previously provided to the payment processing entity. For example, the analytics module 206 may access the event data stored in the event database 214 and determine that the threshold was previously met, and that an indication (e.g., the alert message 600 of FIG. 6) was previously provided to the payment processing entity. Referring back to the above illustration, the analytics module 206 may determine that although the threshold is not met for the merchant's transactions conducted during the current time interval, the threshold was met for a previous time interval, and thus an indication (e.g., the alert message 600 of FIG. 6) was previously provided to the merchant. The method may then proceed to step 812.

Although payment processing entities may not want to receive redundant indications regarding the same potential hardware or software problems, they may want to be notified that a previously detected issue appears to have been resolved. At step 812, in response to determining that the threshold is no longer met for the payment processing entity, the alert module 208 may transmit an indication that the threshold is no longer met to the payment processing entity, the indication including information regarding the performance parameter of the payment processing entity. For example, referring back to the above illustration, the alert module 208 may provide an indication (e.g., the event completion message 700 as shown in FIG. 7) to the merchant. As shown in FIG. 7, the event completion message 700 may inform the merchant that in the current 5 minute time interval, 25 of the merchant's 125 transactions (e.g., 20%) were declined by issuers due to an invalid PIN, and that the merchant's established threshold of 25% is no longer met. This may indicate to the merchant the previous software or hardware issue has been resolved.

Payment processing entities may also be provided with a summary of the previous event after it is determined that a threshold is no longer met. For example, analytics module 206 may determine event statistics such as the total number of time intervals (e.g., the cumulative span of time) during which the threshold was exceeded, and other statistics regarding the event. As seen in FIG. 7, the event completion message 700 may also include the cumulative time interval 7010(*i*) of the previous event, the total number of transactions associated with the performance parameter during the cumulative time interval 700(*j*), the total number of overall transactions during the cumulative time interval 700(*k*), the total percentage of overall transactions associated with the performance parameter during the cumulative time interval 700(*l*), and other information.

In embodiments of the invention, the analytics module 206 may also consider thresholds relating to overall transaction count in making a determination whether to provide an indication to a payment processing entity. For example, the threshold database 212 (or any other database shown in FIG. 2) may store thresholds relating to a minimum number of total transactions that must be processed before an indication is provided. A low number of transactions (i.e. a small sample size) may result in "false positives." In these situations, an indication regarding a performance parameter may be sent to a payment processing entity even though a larger number of transactions would not have triggered the indication. By requiring a minimum number of transactions before providing an indication, such false positives may be reduced. Thresholds relating to overall transaction count may be selected by payment processing entities and/or determined by best practices, recommendations by the payment processing network 118, etc.

Threshold values may change depending on the time of day in some embodiments of the invention. For example, some merchants may consistently experience an increased occurrence of declined transactions at nighttime as compared to other times of the day. Thus, if a threshold relates to the percentage of overall transactions that are declined, the merchant may elect to increase the threshold value during the nighttime to avoid false positives. Such dynamic thresholds may be selected by the payment processing entity, determined by best practices, etc.

Payment processing entities way also want alerts and/or reports including overall performance parameter statistics even if their selected thresholds have not been met. In embodiments of the invention, such alerts and reports may be provided by the server computer 202 to the various payment processing entities. For example, alert module 208 may transmit a "wellness alert" to a payment processing entity on a periodic basis (e.g., twice a day, daily, weekly, monthly etc.) including statistics regarding approved transaction, declined transactions, transaction processing time, communication errors, etc. Such wellness alerts may include a comparison of an entity's performance parameter statistics with those of similarly situated entities (e.g., similar function, size, geographic region, etc.), or a comparison with the entity's own historical statistics. Wellness alerts may provide payment processing entities with confirmation that their transaction processing hardware and software are functioning correctly, and may enable entities to analyze transaction processing trends over time.

Embodiments of the invention provide a number of technical advantages over existing computational solutions to the problem of detecting hardware and software failures at a payment processing entity. For example, by providing an indication that a threshold has been met only if an indication was not previously provided to the payment processing entity, computing resources may be preserved. Alert messages require memory and processing power to generate and send, and by reducing these messages, embodiments of the invention provide for a more efficient and less memory-intensive solution.

Moreover, embodiments of the invention provide a number of business advantages over existing solutions. For example, redundant alerts regarding the same payment processing issue may be distracting and frustrating for payment processing entities, and may result in an inefficient use of the entity's resources. A payment processing entity must typically use personnel and computer resources to monitor, process, and act on alerts regarding processing issues. Thus, once an entity is made aware of a particular issue, further alerts regarding the same processing issue may result in an efficient use of the entity's resources. Redundant alerts may also result in a scenario where alert messages are ignored by the entity, and a new alert regarding an unrelated processing issue may not be acted on. By providing an indication that a threshold has been met only if an indication was not previously provided to the payment processing entity, the entity's business resources may be used more efficiently and effectively. Further, payment processing entities typically earn revenue on a per transaction basis, and rejected or declined transactions often result in lost sales to merchants, lost switch fees to payment processing networks, and lost interchange revenue to issuers, acquirers, and processors. In other words, rejected or declined transactions may result in lost revenue for all payment processing entities involved. By accurately and efficiently detecting unusually high occurrences of the various performance parameters described herein, and by providing prompt notification of such occurrences, payment processing entities may be better equipped to identify and repair hardware or software failures in a timely manner.

III. Exemplary Portable Consumer Devices, Access Devices, and Computer Apparatuses FIGS. 9A-9B show block diagrams of exemplary portable consumer devices according to embodiments of the invention.

Figure 9A:
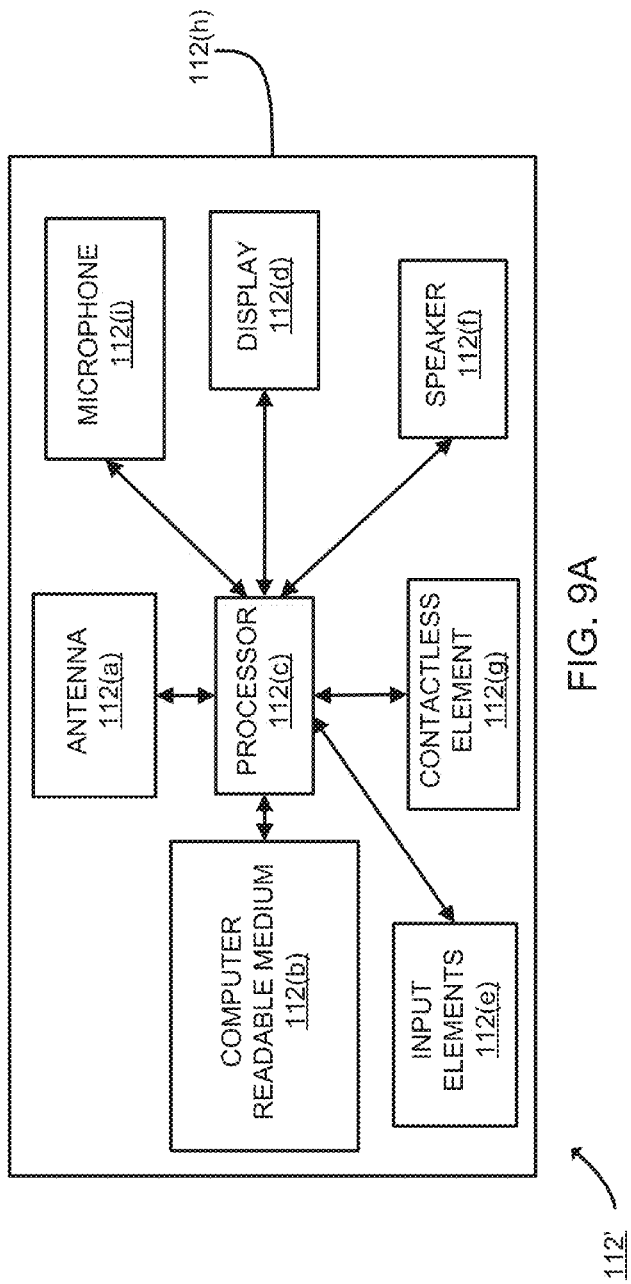
FIGS. 9A-9B show block diagrams of exemplary portable consumer devices according to embodiments of the invention.
Figure 9B:
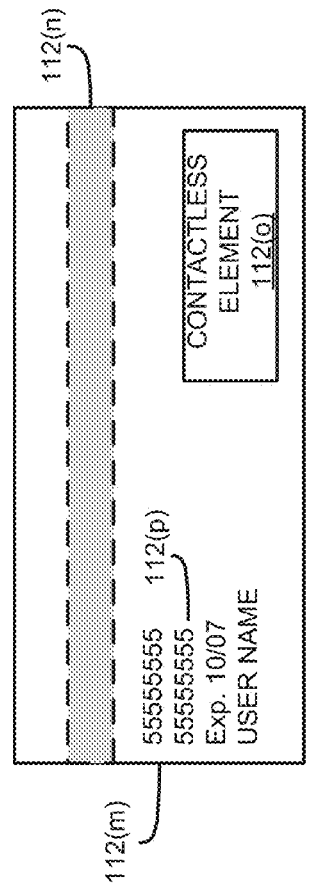

FIG. 9A shows a block diagram of a phone 112' that can be used in embodiments of the invention. The phone 112' can be both a notification device that can receive alert messages, as well as a portable device that can be used to make payments. The exemplary phone 112' may comprise a computer readable medium 112(b) and a body 112(h) as shown in FIG. 9A. The computer readable medium 112(b) may be in the form of (or may be included in) a memory that stores transaction data (e.g., issuer account numbers, loyalty provider account numbers, etc.) and may be in any suitable form including a magnetic stripe, a memory chip, etc. The memory may store information such as financial information, transit information (e.g., as in a subway or train pass), access information (e.g., as in access badges), etc. Financial information may include information such as bank account information, loyalty account information (e.g., a loyalty account number), an issuing bank identification number (BIN), credit or debit card number information, account balance information, an expiration date, consumer information such as the account holder's name, date of birth, etc. Any of this information may be transmitted by the phone 112'.

In some embodiments, information in the memory may also be in the form of data tracks that are traditionally associated with credit cards. Such tracks may include Track 1 and Track 2. Track 1 ("International Air Transport Association") may store more information than Track 2, and may contain the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks abide by it. It contains the cardholder's account, encrypted PIN, plus other discretionary data.

The phone 112' may further include a contactless element 112(g), which may be implemented in the form of a semiconductor chip (or other data storage element) with an associated wireless transfer (e.g., data transmission) element, such as an antenna. The contactless element 112(g) may be associated with (e.g., embedded within) the phone 112' and data or control instructions transmitted via a cellular network may be applied to the contactless element 112(g) by means of a contactless element interface (not shown). The contactless element interface may function to permit the exchange of data and/or control instructions between the mobile device circuitry (and hence the cellular network) and the optional contactless element 112(g).

The contactless element 112(g) may be capable of transferring and receiving data using a near field communications ("NFC") capability (or near field communications medium) in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the phone 112' and an interrogation device. Thus, the phone 112' may be capable of communicating and transferring data and/or control instructions via both a cellular network and near field communications capability.

The phone 112' may also include a processor 112(c) (e.g., a microprocessor) for processing the functions of the phone 112' and a display 112(d) to allow a consumer to see the phone numbers and other information and messages. The phone 112' may further include input elements 112(e) to allow a user to input information into the device, a speaker 112(f) to allow the user to hear voice communication, music, etc., and a microphone 112(*i*) to allow the user to transmit her voice through the phone 112'. The phone 112' may also include an antenna 112(*a*) for wireless data transfer (e.g., data transmission).

If the portable consumer device is in the form of a debit, credit, or smartcard, the portable consumer device may also optionally have features such as magnetic strips. Such devices can operate in either a contact or contactless mode.

An example of a portable consumer device 112" in the form of a card is shown in FIG. 9B. FIG. 9B shows a plastic substrate 112(*m*). A contactless element 112(*o*) for interfacing with an access device may be present on or embedded within the plastic substrate 112(*m*). Consumer information 112(*p*) such as an account number, expiration date, and user name may be printed or embossed on the card. Also, a magnetic stripe 112(*n*) may also be on the plastic substrate 112(*m*). The portable consumer device 112" may also comprise a microprocessor and/or memory chips with user data stored in them.

As shown in FIG. 9B, the portable consumer device 112" may include both a magnetic stripe 112(*n*) and a contactless element 112(*o*). In other embodiments, both the magnetic stripe 112(*n*) and the contactless element 112(*o*) may be in the portable consumer device 112". In other embodiments, either the magnetic stripe 112(*n*) or the contactless element 112(*o*) may be present in the portable consumer device 112".

Figure 10:
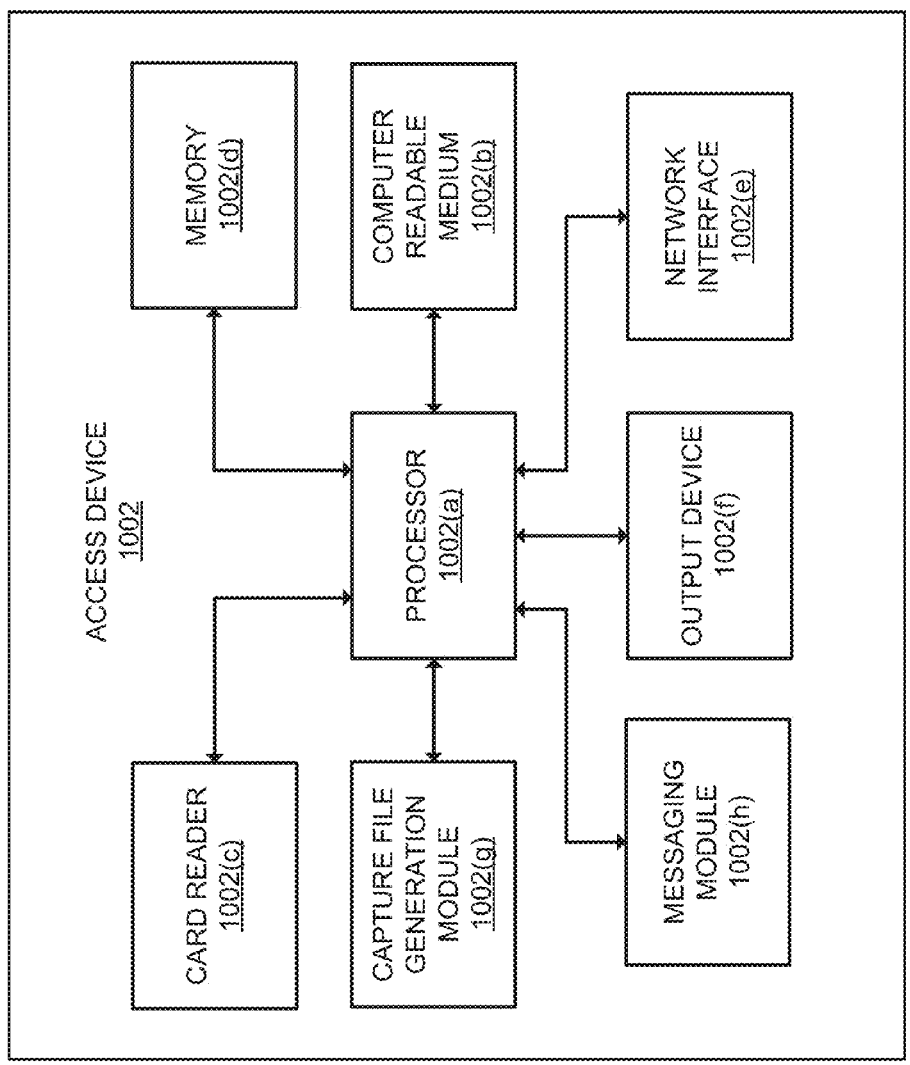
FIG. 10 shows a block diagram of an exemplary access device according to an embodiment of the invention.

FIG. 10 shows a block diagram of an exemplary access device 1002 according to an embodiment of the invention.

As shown in FIG. 10, the access device 1002 may comprise a processor 1002(*a*). It may also comprise a computer readable medium 1002(*b*), a card reader 1002(*c*), a memory 1002(*d*), a network interface 1002(*e*), an output device 1002(*f*), a capture file generation module 1002(*g*), and a messaging module 1002(*h*), all operatively coupled to the processor 1002(*a*). A housing may house one or more of these components. The card reader 1002(*c*) of access device 1002 may include one or more radio frequency (RF) antennas, magnetic stripe readers, etc., that can interact with a portable consumer device such as portable consumer devices 112' and 112" shown in FIGS. 9A-9B. Suitable output devices 1002(*f*) may include displays and audio output devices. Exemplary computer readable media 1002(*b*) may include one or more memory chips, disk drives, etc.

Figure 11:
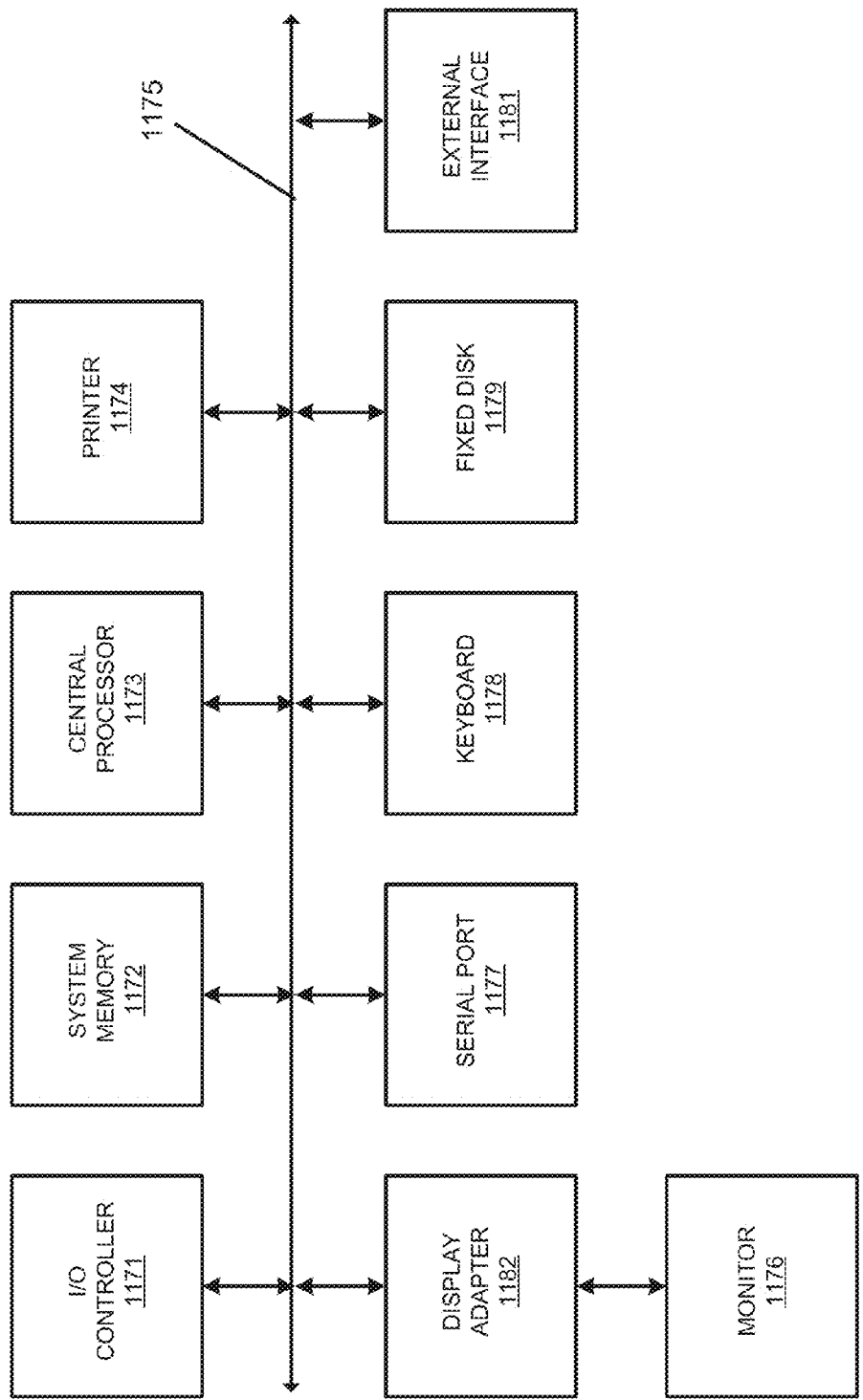
FIG. 11 shows a block diagram of a computer apparatus according to an embodiment of the invention.

FIG. 11 shows a block diagram of a computer apparatus according to an embodiment of the invention.

The various participants and elements may operate one or more computer apparatuses (e.g., server computers) to facilitate the functions described herein, and any of the elements in the figures may use any suitable number of subsystems to facilitate the functions described herein. Examples of such subsystems or components are shown in FIG. 11. The subsystems shown in FIG. 11 are interconnected via a system bus 1175. Additional subsystems such as a printer 1174, keyboard 1178, fixed disk 1179 (or other memory comprising computer readable media), monitor 1176, which is coupled to display adapter 1182, and others are shown. Peripherals and input/output (I/O) devices, which couple to I/O controller 1171, can be connected to the computer system by any number of means known in the art, such as serial port 1177. For example, serial port 1177 or external interface 1181 can be used to connect the computer apparatus to a wide area network such as the Internet, a mouse input device, or a scanner. The interconnection via system bus 1175 may allow the central processor 1173 to communicate with each subsystem and to control the execution of instructions from the system memory 1172 or the fixed disk 1179, as well as the exchange of information between subsystems. The system memory 1172 and/or the fixed disk 1179 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

Some embodiments of the invention may be directed to a method comprising: receiving transaction data associated with a plurality of transactions conducted during a time interval; storing in a first data table, threshold data associated with corresponding transaction types; storing in a second data table, event data indicating whether a threshold has been met for previous transaction conducted during a previous time interval; determining, based on the first data table, whether a threshold associated with a transaction type of the received transaction data has been met by the transaction data associated with the plurality of transactions conducted during the time interval; detecting, based on the second data table, whether a previous indication that the threshold has been met was signaled to a payment processing entity; and signaling an indication that the threshold has been met to the payment processing entity only if no previous indication has been detected.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited in this patent are hereby incorporated by reference for all purposes.

One or more features from any embodiment may be combined with one or more features of any other embodiment without departing from the scope of the disclosure.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
receiving transaction data associated with a plurality of transactions conducted during a time interval;
determining, by a server computer, that the received transaction data meets a threshold;
determining whether a previous indication that the threshold has been met was provided to a payment processing entity, the previous indication being associated with a plurality of previous transactions conducted during a previous time interval; and
if the previous indication was not provided, providing an indication that the threshold has been met to the payment processing entity, the indication including information regarding a performance parameter of the payment processing entity.

2. The method of claim 1, wherein the time interval is a first time interval, and wherein the method further comprises:
after providing the indication, receiving transaction data associated with a plurality of subsequent transactions conducted during a second time interval;
determining, by the server computer, that the received transaction data for the plurality of subsequent transactions does not meet the threshold; and
providing an indication that the threshold has not been met to the payment processing entity, the indication including information regarding the performance parameter of the payment processing entity.

3. The method of claim 1, wherein the payment processing entity comprises a merchant, a payment processor, an acquirer, or an issuer.

4. The method of claim 1, wherein the performance parameter is associated with approved transactions, declined transactions, rejected transactions, transaction processing time, or transaction processing communication errors.

5. The method of claim 1, wherein the time interval is a predetermined increment of time.

6. The method of claim 1, wherein the threshold is a predetermined value or a dynamic value.

7. The method of claim 1, wherein providing the indication includes providing an alert message to the payment processing entity.

8. A server computer comprising:
a processor; and
a computer readable medium coupled to the processor, wherein the computer readable medium comprises code executable by a processor for implementing a method comprising:
receiving transaction data associated with a plurality of transactions conducted during a time interval;
determining, by a server computer, that the received transaction data meets a threshold;
determining whether a previous indication that the threshold has been met was provided to a payment processing entity, the previous indication being associated with a plurality of previous transactions conducted during a previous time interval; and
if the previous indication was not provided, providing an indication that the threshold has been met to the payment processing entity, the indication including information regarding a performance parameter of the payment processing entity.

9. The server computer of claim 8, wherein the time interval is a first time interval, and wherein the computer readable medium further comprises code executable by the processor for implementing a method comprising:
after providing the indication, receiving transaction data associated with a plurality of subsequent transactions conducted during a second time interval;
determining, by the server computer, that the received transaction data for the plurality of subsequent transactions does not meet the threshold; and
providing an indication that the threshold has not been met to the payment processing entity, the indication including information regarding the performance parameter of the payment processing entity.

10. The server computer of claim 8, wherein the payment processing entity comprises a merchant, a payment processor, an acquirer, or an issuer.

11. The server computer of claim 8, wherein the performance parameter is associated with approved transactions, declined transactions, rejected transactions, transaction processing time, or transaction processing communication errors.

12. The server computer of claim 8, wherein the time interval is a predetermined increment of time.

13. The server computer of claim 8, wherein the threshold is a predetermined value or a dynamic value.

14. The server computer of claim 8, wherein providing the indication includes providing an alert message to the payment processing entity.

15. A method comprising:
transmitting, by a payment processing entity, transaction data associated with a plurality of transactions conducted during a time interval to a server computer associated with a payment processing network, wherein the server computer determines that the transmitted transaction data meets a threshold, and wherein the server computer determines whether a previous indication that the threshold has been met was provided to the payment processing entity, the previous indication being associated with a plurality of previous transactions conducted during a previous time interval; and
if the previous indication was not provided, receiving, from the server computer, an indication that the threshold has been met, the indication including information regarding a performance parameter of the payment processing entity.

16. The method of claim 15, wherein the time interval is a first time interval, and wherein the method further comprises:
after receiving the indication, transmitting transaction data associated with a plurality of subsequent transactions conducted during a second time interval to the server computer associated with the payment processing network, wherein the server computer determines that the transmitted transaction data for the plurality of subsequent transactions does not meet the threshold; and
receiving, from the server computer, an indication that the threshold has not been met, the indication including information regarding the performance parameter of the payment processing entity.

17. The method of claim 15, wherein the payment processing entity comprises a merchant, a payment processor, an acquirer, or an issuer.

18. The method of claim 15, wherein the performance parameter is associated with approved transactions, declined transactions, rejected transactions, transaction processing time, or transaction processing communication errors.

19. The method of claim 15, wherein the time interval is a predetermined increment of time.

20. The method of claim 15, wherein the threshold is a predetermined value or a dynamic value.

21. The method of claim 15, wherein receiving the indication includes receiving an alert message from the computer associated with the payment processing network.

* * * * *